US012265522B2

(12) United States Patent
Bjones et al.

(10) Patent No.: US 12,265,522 B2
(45) Date of Patent: Apr. 1, 2025

(54) CONFIDENTIAL BLOCKCHAIN DATABASE WITH A DISTRIBUTED LEDGER

(71) Applicant: Microsoft Technology Licensing, LLC, Redmond, WA (US)

(72) Inventors: Ronald John Kamiel Euphrasia Bjones, Dilbeek (BE); Wei-Lun Tsai, Seattle, WA (US); Mark Eugene Russinovich, Bellevue, WA (US); Sylvan W. Clebsch, Cambridge (GB); Amaury Pierre Paul Chamayou, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/877,033

(22) Filed: Jul. 29, 2022

(65) Prior Publication Data
US 2024/0037092 A1    Feb. 1, 2024

(51) Int. Cl.
*G06F 16/00*    (2019.01)
*G06F 7/00*    (2006.01)
*G06F 16/23*    (2019.01)
*G06F 16/27*    (2019.01)

(52) U.S. Cl.
CPC .......... *G06F 16/2379* (2019.01); *G06F 16/27* (2019.01)

(58) Field of Classification Search
CPC ............................. G06F 16/2379; G06F 16/27
USPC ........................................................ 707/703
See application file for complete search history.

(56) References Cited

U.S. PATENT DOCUMENTS

| 2020/0117825 | A1  | 4/2020  | Vaswani et al. |
| 2020/0159697 | A1* | 5/2020  | Wood ................... G06F 16/162 |
| 2021/0014132 | A1* | 1/2021  | Smith ................... H04L 9/3239 |
| 2021/0034606 | A1* | 2/2021  | Stamos ................ G06F 16/184 |
| 2021/0377037 | A1  | 12/2021 | Antonopoulos et al. |
| 2022/0027344 | A1* | 1/2022  | Innocenti .............. G06Q 10/10 |
| 2023/0245117 | A1* | 8/2023  | Higgins .............. G06Q 20/389 |
|              |     |         |                          705/39 |

OTHER PUBLICATIONS

"International Search Report and Written Opinion Issued in PCT Application No. PCT/US23/025098", Mailed Date: Sep. 15, 2023, 10 Pages.

* cited by examiner

*Primary Examiner* — Raquel Perez-Arroyo
(74) *Attorney, Agent, or Firm* — Alleman Hall & Tuttle LLP

(57) ABSTRACT

The disclosed technology is generally directed to a distributed query-and-command system. In one example of the technology, in a trusted execution environment (TEE) of a first node, database code of the first node and distributed ledger code of the first node is executed, such that execution of the distributed ledger code of the first node instantiates a first instance of a distributed ledger of a consortium blockchain, and such that execution of the query-and-command code of the first node instantiates a first instance of a query-and-command system. The consortium blockchain is distributed among a plurality of nodes, and the query-and-command system is distributed among the plurality of nodes. A first transaction that is associated with modifying the query-and-command system is received. The first transaction is executed. Changes associated with the first transaction to the distributed ledger are persisted.

18 Claims, 5 Drawing Sheets

CONFIDENTIAL BLOCKCHAIN DATABASE WITH A DISTRIBUTED LEDGER

BACKGROUND

Blockchain systems have been proposed for a variety of application scenarios, including applications in the financial industry, health care, IoT, and so forth. For example, the Bitcoin system was developed to allow electronic cash to be transferred directly from one party to another without going through a financial institution. A bitcoin (e.g., an electronic coin) is represented by a chain of transactions that transfers ownership from one party to another party. To transfer ownership of a bitcoin, a new transaction may be generated and added to a stack of transactions in a block. The new transaction, which includes the public key of the new owner, may be digitally signed by the owner with the owner's private key to transfer ownership to the new owner as represented by the new owner public key.

Once the block is full, the block may be "capped" with a block header that is a hash digest of all the transaction identifiers within the block. The block header may be recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain may create a mathematical proof of ownership in an entity represented by a security identity (e.g., a public key), which in the case of the bitcoin system is pseudo-anonymous.

A blockchain is one type of distributed ledger. A distributed ledger is a record of consensus with a cryptographic audit trail which is typically maintained and validated by several separate nodes.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to a distributed query-and-command system. In some examples, in a trusted execution environment (TEE) of a first node, database code of the first node and distributed ledger code of the first node is executed, such that execution of the distributed ledger code of the first node instantiates a first instance of a distributed ledger of a consortium blockchain, and such that execution of the query-and-command code of the first node instantiates a first instance of a query-and-command system. The blockchain is distributed among a plurality of nodes, and the query-and-command system is distributed among the plurality of nodes. In some examples, a first transaction that is associated with modifying the query-and-command system is received. In some examples, the first transaction is executed. In some examples, changes associated with the first transaction to the distributed ledger are persisted.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
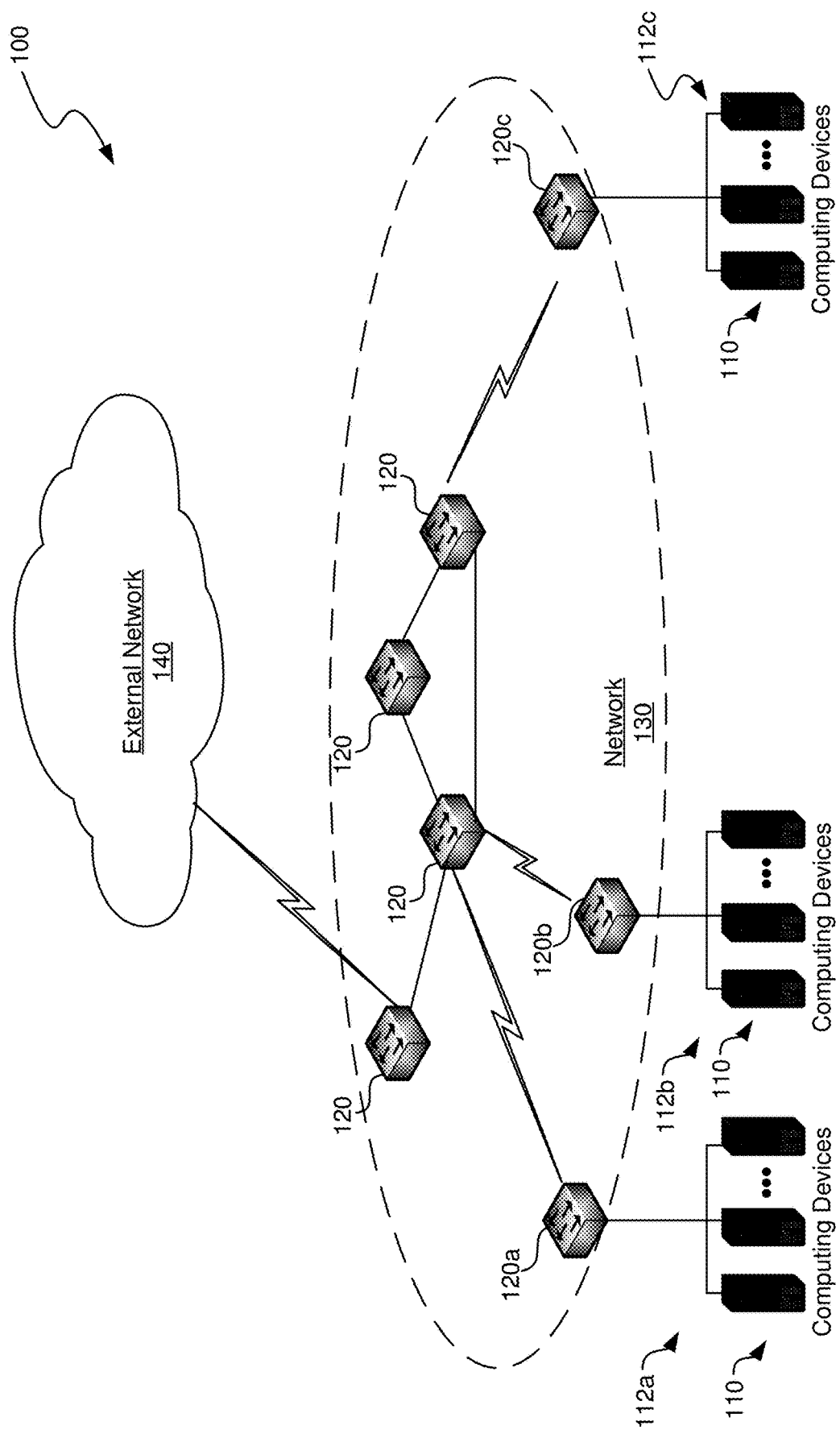
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud, but are devices that serve as an entry point into enterprise or service provider core networks.

Briefly stated, the disclosed technology is generally directed to a distributed query-and-command system. In some examples, in a trusted execution environment (TEE) of a first node, database code of the first node and distributed ledger code of the first node is executed, such that execution of the executed distributed ledger code of the first node instantiates a first instance of a distributed ledger of a consortium blockchain, and such that execution of the query-and-command code of the first node instantiates a first instance of a query-and-command system. The blockchain system is distributed among a plurality of nodes, and the query-and-command system is distributed among the plurality of nodes. In some examples, a first transaction that is associated with modifying the query-and-command system is received. In some examples, the first transaction is executed. In some examples, changes associated with the first transaction to the distributed ledger are persisted.

Building a database or other query-and-command system with data consistency, availability, and fault tolerance all while synchronizing with blockchain network consensus are technical challenges that remain unsolved in the background art. If not built properly, adding blockchain to a database may result in performance degradation, higher storage costs, and extensive application code changes that require building outside the database API. In some examples, a query-and-command system, such as a database or a message broker, can be used in an unmodified way in a consortium blockchain network in a way that is tamper-resistant and guarantees confidentiality, integrity, availability, and proof as to whether or not tampering has occurred.

In some examples, a consortium blockchain can be bootstrapped based on multiple nodes, where each node includes a trusted execution environment (TEE). The TEE in each node of the consortium blockchain may include both a database instance (or other query-and-command system instance) and a distributed ledger instance. After the consortium blockchain is bootstrapped and begins normal operation, the distributed ledger instance on each node in the consortium blockchain may operate as a distributed ledger. Similarly, after the consortium blockchain is bootstrapped and begins normal operation, the database on each node in the consortium blockchain may operate as a database (or other query-and-command system) that is distributed among the nodes of the consortium database.

Clients may make use of the database in the standard manner. In some examples, neither the database itself nor the behavior of the clients needs to be altered based on the fact that the database is distributed on the consortium blockchain. Rather, the clients may follow the same procedures that they would for the database if the database were not on a consortium blockchain.

Accordingly, a client may initiate a transaction with the database in a normal manner. When a client initiates a transaction, the transaction may be communicated to one of the nodes of the consortium blockchain. Each TEE may include a journal of effects/modifications to the database. In some examples, the journal is a write-ahead log (WAL). In some examples, each entry in the journal indicates the change in the database that results from execution of the transactions. In some examples, the journal contains commit points. In some examples, a commit point indicates the point in which the journal entries since the last commit point are committed to the database. When a commit point is reached, in some examples, the database is updated based each of the journal entries since the last commit point.

Accordingly, when a client initiates a transaction, the client may do so in a standard manner, such as via the standard API used for the database. Information may be communicated back to the client as normal for the database. In some examples, each WAL entry that would normally be generated for the transaction is saved to the distributed ledger, and the updates to the distributed ledger are replicated among each of the nodes in the consortium blockchain. The transaction may be executed as normal for the database, where the database is distributed among the nodes of the consortium blockchain. In some examples, the database is updated as normal at each commit point, and, after successful commit, the changes to the database are replicated among each of the nodes of the consortium blockchain. In some examples, the replication is done in a confidential and integrity-protected manner. The TEE can also be used to provide a universally verifiable receipt for each transaction, and the receipt may be provided to the client upon request. In various examples, the receipt can be provided as a part of the client's database transaction query or as an out-of-band request, e.g., to initiate a database query specifically to retrieve the receipt(s). The universally verifiable receipts may be used to cryptographically prove the manner in which the transactions actually happened.

In some examples, the WAL journal on the distributed ledger is the authority of the state of the database. The database can be recovered from the WAL journal on the distributed ledger. Because (1) the code for the distributed ledger and the database run in TEEs, (2) the distributed ledger uses distributed consensus and governance that is trusted, verifiable, and auditable by TEE attestation, and (3) universally verifiable receipts are used, a blockchain-based database system may be provided that is confidential, online auditable for integrity protection, offline auditable for integrity protection, and tamper-resistant.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including a local computer, on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices no can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general-or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/ or other suitable computing services.

In some examples, one or more of the computing devices 110 is a device that is configured to be at least part of a distributed query-and-command system.

Illustrative Computing Device

Figure 2:
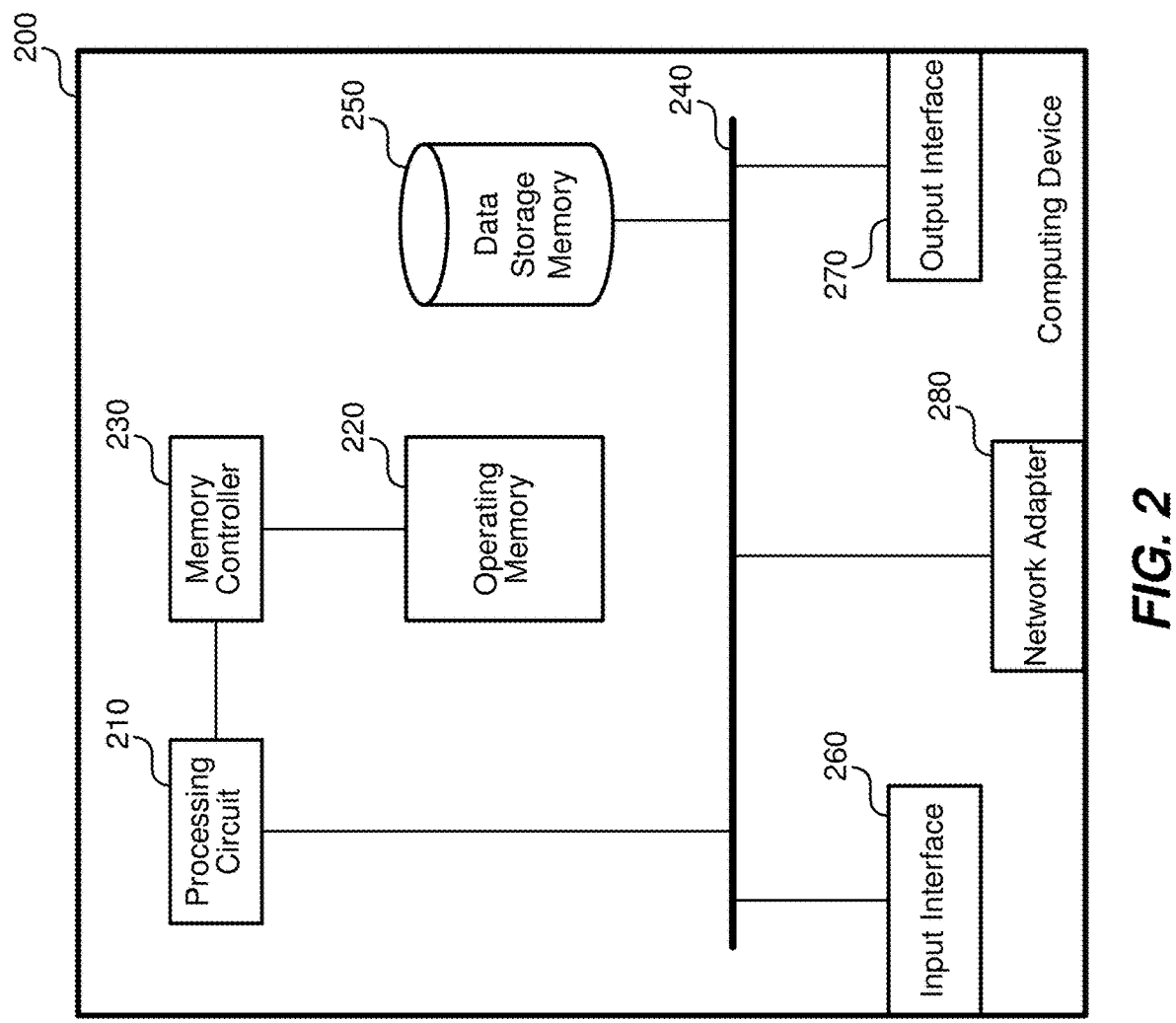
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be a server device such as an application server computer, a virtual computing host computer, or a file server computer, e.g., computing device 200 may be an example of computing device 110 or network node 120 of FIG. 1. Likewise, computer device 200 may be an example any of the devices, a device within any of the distributed systems, illustrated in or referred to in any of the following figures, as discussed in greater detail below. As illustrated in FIG. 2, computing device 200 may include processing circuit 210, operating memory 220, memory controller 230, bus 240, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, and/or technology. Processing circuit 210 may include a microprocessor, a microcontroller, a graphics processor, a coprocessor, a field-programmable gate array, a programmable logic device, a signal processor, and/or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, and/or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), and/or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, and/or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although FIG. 2 illustrates bus 240 as a single passive bus, other configurations, such as a collection of buses, a collection of point-to-point links, an input/output controller, a bridge, other interface circuitry, and/or any collection thereof may also be suitably employed for interfacing data storage memory 250, input interface 260, output interface 270, and/or network adapter 28o to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, and/or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for runtime data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter (UART), a Serial Peripheral Interface (SPI), Inter-Integrated Circuit (I2C), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 200 is illustrated with certain components configured in a particular arrangement, these components and arrangements are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Figure 5:
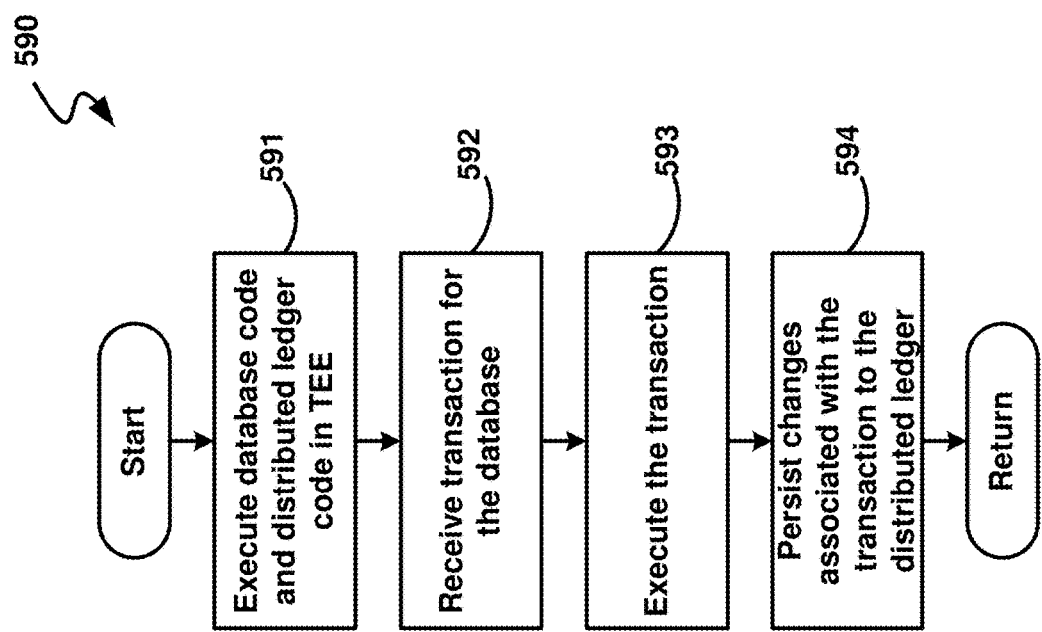
FIG. 5 is a flow diagram illustrating an example process for a distributed query-and-command system, in accordance with aspects of the disclosure.

Some examples of computing device 200 include at least one memory (e.g., operating memory 220) having processor-executable code stored therein, and at least one processor (e.g., processing unit 210) that is adapted to execute the processor-executable code, wherein the processor-executable code includes processor-executable instructions that, in response to execution, enables computing device 200 to perform actions, where the actions may include, in some examples, actions for one or more processes described herein, such as the process shown in FIG. 5, as discussed in greater detail below.

Illustrative Systems

Figure 3:
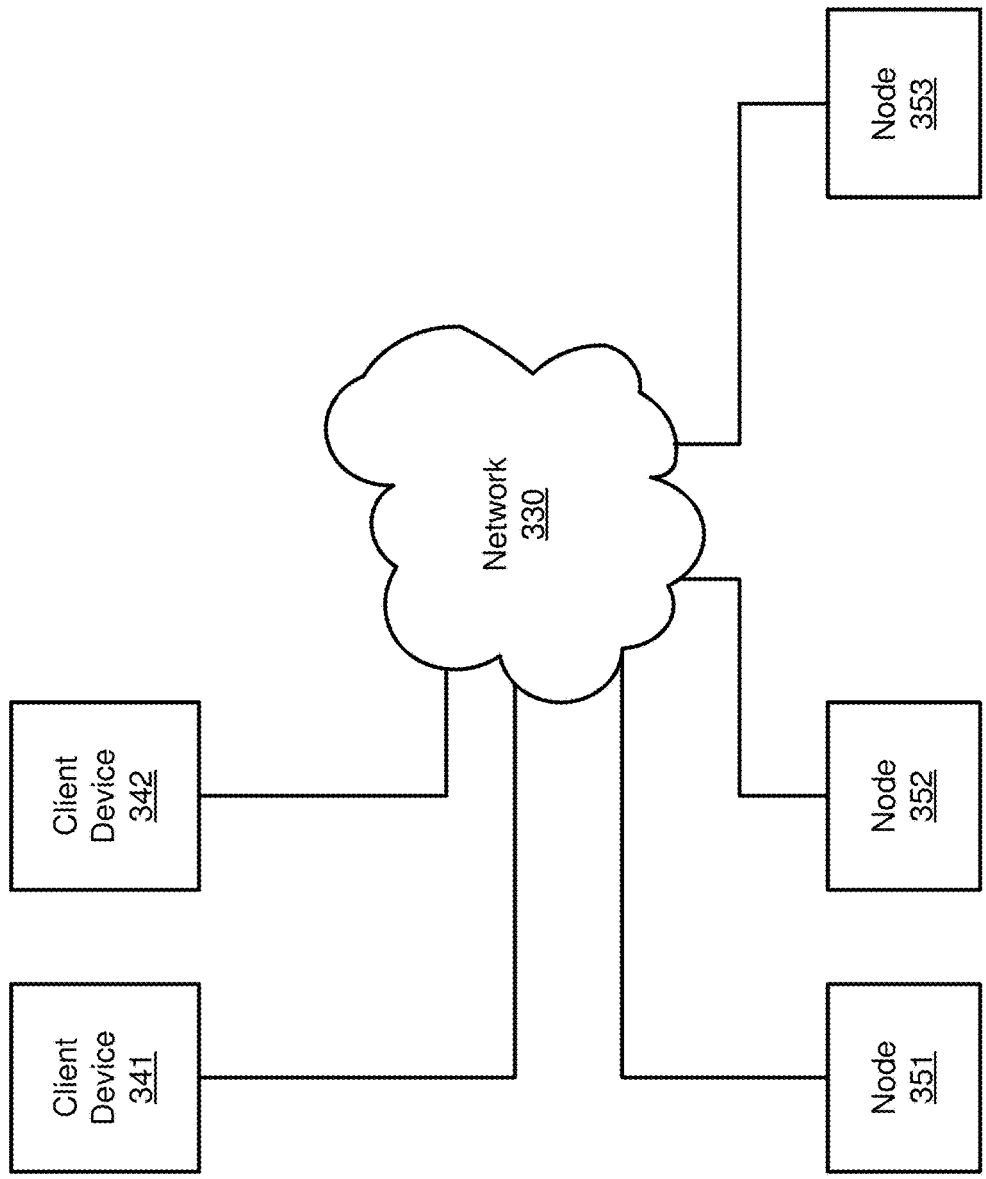
FIG. 3 is a block diagram illustrating an example of a network-connected system.

FIG. 3 is a block diagram illustrating an example of a system (300). System 300 may include network 330, as well as client devices 341 and 342 and nodes 351, 352, and 353, which, in some examples, all connect to network 330.

Each of client devices 341 and 342 and nodes 351, 352, and 353 may include examples of computing device 200 of FIG. 2. FIG. 3 and the corresponding description of FIG. 3 in the specification illustrate an example system for illustrative purposes that does not limit the scope of the disclosure.

The nodes may operate together to provide a consortium blockchain. Each of the nodes 351-353 may include a TEE. In some examples, the TEE executes a distributed leger instance, and also executes an instance of a serialized query-and-command system that uses transactional semantics. Accordingly, the nodes together may provide a distributed ledger and a serialized query-and-command service that is distributed among the nodes. Clients may make use of the serialized query-and-command service via client devices, such as client devices 341 and 342. In some examples, clients may communicate with the serialized query-and-command service in the normal manner that they would communicate with the serialized query-and-command service, without regard to the fact that the serialized query-and-command service is a blockchain-based serialized query-and-command service.

For instance, in some examples, the serialized query-and-command service is a database service using a standard database, such as PostgreSQL, using the standard API for PostgreSQL. Communications to and from the database may happen in the same manner as normal for communicating with a database service, except that client may also request and receive universally verifiable receipts for a transaction.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, and/or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. In essence, network 330 may include any suitable network-based communication method by which information may travel among client devices 341 and 342 and nodes 351, 352, and 353. Although each device is shown connected as connected to network 330, that does not necessarily mean that each device communicates with each other device shown. In some examples, some devices shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown instead communicating with each other with a different network of the multiple networks.

System 300 may include more or less devices than illustrated in FIG. 3, which is shown by way of example only.

Figure 4:
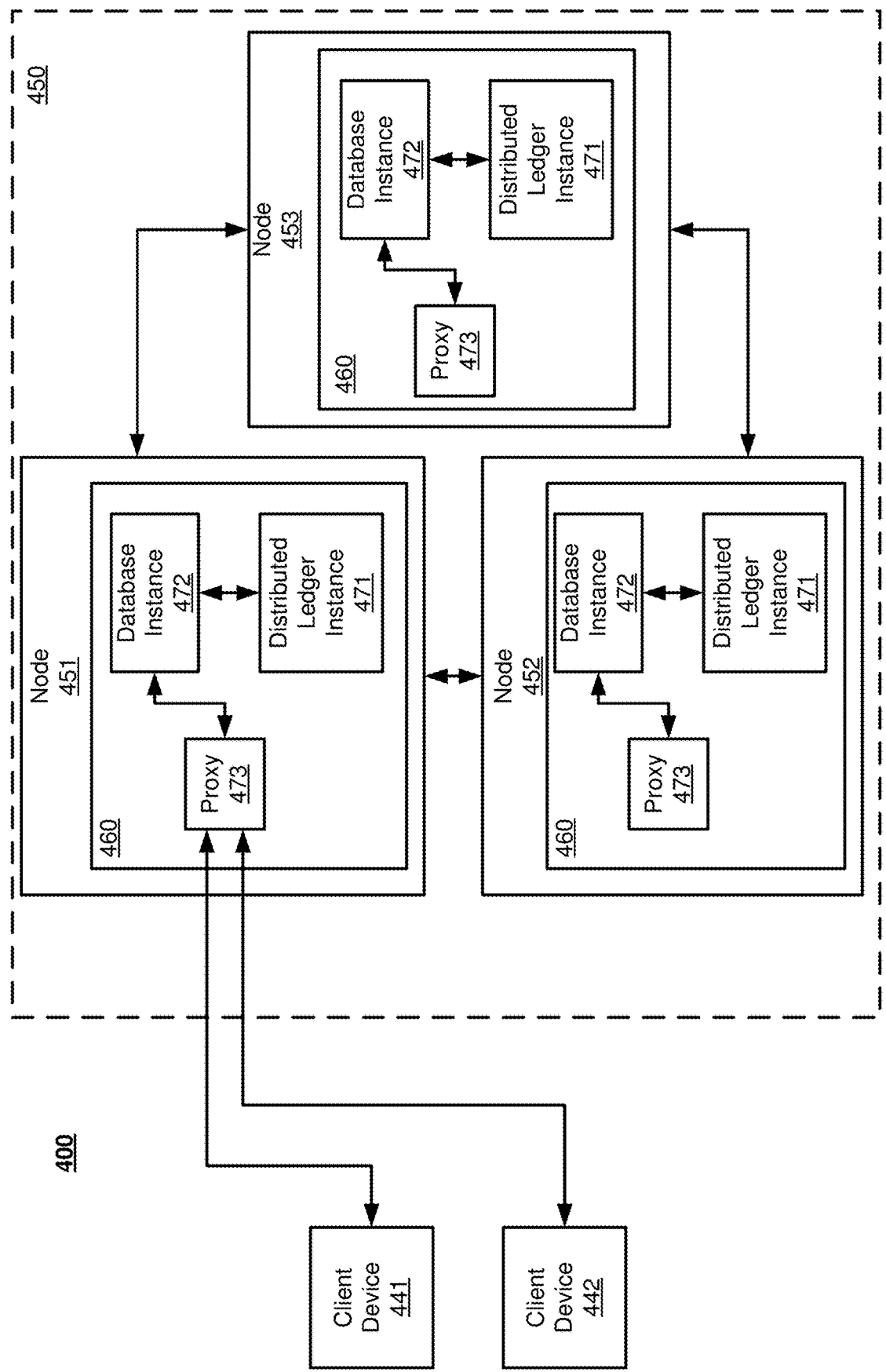
FIG. 4 is a block diagram illustrating an example of a system for a distributed query-and-command system.

FIG. 4 is a block diagram illustrating an example of a system (400). System 400 may be an example of a portion of system 300 of FIG. 3. System 400 may include client device 441, client device 442, and consortium blockchain 450. Consortium blockchain 450 may include nodes 451, 452, and 453. Consortium blockchain 450 may include more or less than three nodes, which are shown by way of example only. In some examples, each of the nodes (e.g., nodes 451-453) in consortium blockchain 450 includes TEE 460. Each TEE 460 in each of nodes 451, 452, and 453 may include distributed ledger instance 471, database instance 472, and proxy 473.

A TEE is a portion of a processor that is secure in a particular manner which, among other things, guarantees that code and data loaded inside of the TEE is protected with regard to confidentiality and integrity. An example of a TEE is Intel® Software Guard Extensions.

Blockchain consortium 450 may provide a blockchain-based database to clients. Clients may communicate with the database via client devices, such as client devices 441 and 442. The database may be tamper-resistant, and the database may provide confidentiality, full execution database integrity protection, and decentralized trust. The database may also allow for the programming of the database to be unmodified by the fact that the database is being used on the blockchain. Additionally, an existing database may be used by consortium blockchain 450 with lift-and-shift deployment.

In some examples, operation of system 400 may be accomplished by first bootstrapping consortium blockchain 450. In some examples, consortium blockchain 450 has a governance process that defines, among other things, the code to be run in the TEE of each of the nodes (e.g., nodes 451-453) of consortium blockchain 450, including the distributed ledger code and the database code. As part of the bootstrap process, in some examples, each of the nodes verifies, by TEE attestation, that the each of the nodes complies with the governance process. In this way, in these examples, it can be ensured, by TEE attestation, that the code each node in consortium blockchain 450 is fully in accordance with the governance process. The TEE attestation of the code running in a TEE 460 may be performed remotely, including by other nodes and by clients, as hardware-generated cryptographic proof of all of the code that is running in the TEE 460.

Blockchain consortium 450 may contain different number of nodes in various examples. In some examples, blockchain consortium 450 may use a crash-fault-tolerant model. In other examples, blockchain consortium 450 may use a fault-tolerant model other than a crash-fault-tolerant model. In some examples, blockchain consortium 450 may use a byzantine fault-tolerant protocol. In some examples, blockchain consortium 450 uses a 2F+1 crash-fault-tolerant model or a 3F+1 byzantine fault tolerant model, where F is the number of nodes that can simultaneously fail with the system still being correct and reliable. In other examples, other suitable models may be employed.

The nodes in blockchain consortium 450 may be located in various locations in various examples. For instance, in some examples, each of the nodes in blockchain consortium 450 may each run in the same rack in a data center or other location. In other examples, the nodes in blockchain consortium 450 may be distributed among several different data centers and/or other locations globally. The nodes may be distributed in any suitable manner in various examples.

In some examples, the bootstrapping of blockchain consortium 450 is complete once: enough nodes are running according to the model (e.g., fault tolerance model) being employed, the nodes are each verified with each other according to the governance model, and the nodes are performing the consensus model indicated in the governance process amongst the nodes. Once the bootstrapping of consortium blockchain 450 is successfully completed, in some examples, consortium blockchain 450 runs a distributed ledger based on a distributed ledger instance 471 running in the TEE 460 of each node of consortium blockchain 450, and runs a database that is distributed among the nodes of consortium blockchain 450 based on a database instance 472 running in the TEE 460 of each node of consortium blockchain 450. In some examples, each node in consortium blockchain 450 include a TEE 460 that includes distributed ledger code, database code, and proxy code. In some examples, for the TEE 460 in each node of consortium blockchain 450, the executed distributed ledger code is the distributed ledger instance 471 of the node, the executed database code is the database instance 472 of the node, and the executed proxy code is the proxy 473 for the node. For instance, more specifically, in some examples, for the TEE 460 in each node of consortium blockchain 450, execution of the distributed ledger code instantiates the distributed ledger instance 471 of the node, execution of the database code instantiates the database instance 472 of the node, and execution of the proxy code instantiates the proxy 473 for the node.

A client may use a client device (e.g., client device 441 or client device 442) to initiate a transaction with the database in the normal matter. That is, the client may initiate a transaction with the database in the same manner normally used for the database, with no changes needed based on the fact that the database is on a blockchain. For instance, in some examples, the database is PostgreSQL, and the client may initiate a transaction with the database using the PostgreSQL API. In some examples, the database is a relational database. In other examples, the database is a suitable database that is not a relational database.

When a client initiates a transaction with the database, the transaction may be communicated to one of the nodes of consortium blockchain 450. In some examples, the transaction may be initially received by the proxy 473 running in the TEE 460 of the receiving node of consortium blockchain 450. The proxy 473 may act as an intermediary for communication between the client and the database instance 472, including forwarding communication from the proxy 473 to the database instance 472. The proxy 473 may also perform other administrative functions. In some examples, the proxy 473 executes in a confidential container instance within the TEE 460.

In some examples, the client may communicate with the proxy 473 in one of the nodes of consortium blockchain 450 via an encrypted and authenticated network channel. In some examples, a client may optionally choose to request a remote attestation report from consortium blockchain 450 to validate that the client is communicating with the correct database. Once the communication is initiated, the client can send database query commands in the normal manner in which database query commands are communicated to the database that is being used, and the client receives results from the query commands in the normal manner that would occur for the database that is being used.

Each TEE 460 may include a journal of modifications to the database. In some examples, the journal is a write-ahead log (WAL). In some examples, each entry in the journal indicates the change in the database that results from execution of the transactions. In some examples, there is one entry in the journal for each incremental change in the database. In some examples, the journal contains commit points. In some examples, the commit points indicate the points in which the journal entries since the last commit point are committed to the database. When a commit point is reached, in some examples, the database is updated based each of the journal entries since the last commit point. For instance, in some examples, changes associated with a transaction are persisted to the distributed ledger, and persisting the changes associated with the transaction to the distributed ledger includes updating a WAL in the distributed ledger, such that the WAL is updated to add, for each change made to the database based on the transaction, a WAL entry that corresponds to the change. In some examples, the ledger includes a Merkle tree over the WAL entries.

As discussed above, in some examples, when a client initiates a transaction, the client does so in a standard manner, such as via the standard API used for the database. Information may be communicated back to the client as normal for the database. Each WAL entry that would normally be generated for the transaction is saved to the distributed ledger, and the updates to the distributed ledger are replicated among each of the nodes in the consortium blockchain. The transaction is executed as normal for the database in some examples, where the database is distributed among the nodes of consortium blockchain 450.

In some examples, the database is updated as normal at each commit point. In some examples, commitment of the transaction into the ledger is gated by a consensus vote within consortium blockchain 450. This "gating" means that, in some examples, the transaction cannot be committed into the ledger unless a successful consensus vote to commit the transaction to the ledger is made by consortium blockchain 450. As discussed in greater detail above, in some examples, the consensus is performed based on the consensus model that is indicated in the governance model of consortium blockchain 450. In some examples, the gating is performed by proxy 473. In some examples, after a successful commit, the changes to the database are replicated among each of the nodes of consortium blockchain 450. In some examples, the replication is done in a confidential and integrity-protected manner. In some examples, a validation of the authenticity of the records is performed prior to any replication being performed. In some examples, the replication is also gated by a consensus vote within consortium blockchain 450 that is also performed by proxy 473.

The TEE can also be used to provide a universally verifiable receipt for each transaction, and the receipt may be provided to the client upon request by the client. In some examples, the universally verifiable receipts cryptographically prove, in a tamper-resistant manner, that the transactions happened, the manner in which the transactions actually happened, and results of the transactions, regardless of whether any compromises occurred. In some examples, the universally verifiable receipts can be independently audited.

In some examples, each universally verifiable receipt is a cryptographic proof that is both offline verifiable and online verifiable, and which does not require any reference to the database, or even require that the ledger still exists. In some examples, each universally verifiable receipt includes a Merkle tree proof of the inclusion of the commit in the ledger. In some examples, in addition to the Merkle tree proof, the universally verifiable receipt includes a root hash that is signed by consortium blockchain 450.

In some examples, if one of the nodes of consortium blockchain 450 is tampered with, this will be discovered by the consensus algorithm used by consortium blockchain 450. Upon discovery that a node in consortium blockchain 450 has been tampered with, in some examples, the node can be automatically isolated for forensics review, and the node can be replaced with another node.

In some examples, even if the database is destroyed, the database can be fully recovered and reconstructed from the WAL entries in the distributed ledger. In some examples, new nodes can be created using the recovered and reconstructed database. In some examples, because the TEE is used as the root of trust, each WAL entry can be replicated relatively quickly, the transaction latency is relatively low, and consortium blockchain 450 can process a relatively large number of transactions per second. In some examples, the TEE is used as the method of establishing trust and/or as the consensus algorithm. In other examples, proof of work, proof of stake, or another suitable method of establishing trust and/or as the consensus algorithm may be used.

Illustrative Processes

FIG. 5 a diagram illustrating an example dataflow for a process (590) for the operation of a CTS instance. In some examples, process 590 may be performed by an example of one of the nodes 351-353 of FIG. 3, by an example of one of the TEEs 460 of FIG. 4, by an example of device 200 of FIG. 2, or the like.

In the illustrated example, step 591 occurs first. At step 591, in some examples, in a trusted execution environment (TEE) of a first node, database code of the first node and distributed ledger code of the first node is executed, such that execution of the distributed ledger code of the first node instantiates a first instance of a distributed ledger of a consortium blockchain, and such that execution of the query-and-command code of the first node instantiates a first instance of a query-and-command system. The consortium blockchain is distributed among a plurality of nodes, and the query-and-command system is distributed among the plurality of nodes.

As shown, step 592 occurs next in some examples. At step 592, in some examples, a first transaction that is associated with modifying the query-and-command system is received. As shown, step 593 occurs next in some examples. At step 593, in some examples, the first transaction is executed. As shown, step 594 occurs next in some examples. At step 594, in some examples, changes associated with the first transaction to the distributed ledger are persisted. The process may then advance to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a device including at least one memory having processor-executable code stored therein, and at least one processor that is adapted to execute the processor-executable code, wherein the processor-executable code includes processor-executable instructions that, in response to execution, enable the device to perform actions, including:
verifying, by a first node using trusted execution environment (TEE) attestation, that a plurality of other nodes complies with a governance process defined by a consortium blockchain, wherein the consortium blockchain comprises the first node and the plurality of other nodes;
executing, in a TEE of the first node, database code and distributed ledger code, such that the distributed ledger code is distributed among the first node and the plurality of other nodes of the consortium blockchain to provide a distributed ledger, and such that execution of the database code of the first node instantiates a first instance of a database, wherein the database is distributed among the first node and the plurality of other nodes, wherein the TEE comprises a portion of the processor that provides confidentiality and integrity to loaded code and data;
receiving a first transaction that is associated with modifying the database;
executing the first transaction;
receiving a second transaction that is associated with modifying the database;
executing the second transaction;
persisting changes associated with the first and second transactions to the distributed ledger by updating a journal of effects in the distributed ledger, wherein the journal of effects comprises a first entry generated for the first transaction and a second entry generated for the second transaction, and wherein the journal of effects further comprises a commit point after the first entry and the second entry; and
upon reaching the commit point, updating the database based on entries in the journal of effects since a last commit point, wherein the entries in the journal of effects since the last commit point comprise the first entry and the second entry.

2. The apparatus of claim 1, the actions further including executing, in the TEE of the first node, proxy code.

3. The apparatus of claim 1, wherein the database is a relational database.

4. The apparatus of claim 1, wherein the actions further include providing a universally verifiable receipt for the first transaction, wherein the universally verifiable receipt includes a Merkle tree proof and a signed root hash.

5. The apparatus of claim 1, wherein the actions further include using the distributed ledger to recover the database.

6. The apparatus of claim 1, wherein persisting the changes associated with the first transaction to the distributed ledger is accomplished responsive to a successful consensus vote within the consortium blockchain.

7. A method, comprising:
verifying, by a first node using trusted execution environment (TEE) attestation, that a plurality of other nodes complies with a governance process defined by a consortium blockchain, wherein the consortium blockchain comprises the first node and the plurality of other nodes;
executing, in a TEE of the first node, query-and-command code of the first node, database code of the first node, and distributed ledger code of the first node, such that execution of the distributed ledger code of the first node instantiates a first instance of a distributed ledger of the consortium blockchain, and such that execution of the query-and-command code of the first node instantiates a first instance of a query-and-command system, wherein the consortium blockchain is distributed among the first node and the plurality of other nodes, and wherein the query-and-command system is distributed among the first node and the plurality of other nodes;
receiving a first transaction that is associated with modifying the query-and-command system;
executing the first transaction;
receiving a second transaction that is associated with modifying the query-and-command system;
executing the second transaction;
persisting changes associated with the first and second transactions to the distributed ledger by updating a journal of effects in the distributed ledger, wherein the journal of effects comprises a first entry generated for the first transaction and a second entry generated for the second transaction, and wherein the journal of effects further comprises a commit point after the first entry and the second entry; and
upon reaching the commit point, updating a database of the query-and-command system based on entries in the journal of effects since a last commit point, wherein the entries in the journal of effects since the last commit point comprise the first entry and the second entry.

8. The method of claim 7, wherein the query-and-command system is at least one of a message broker.

9. The method of claim 7, further comprising: executing, in the TEE of the first node, proxy code.

10. The method of claim 7, wherein the query-and-command system is a relational database.

11. The method of claim 7, further comprising: providing a universally verifiable receipt for the first transaction, wherein the universally verifiable receipt includes a Merkle tree proof and a signed root hash.

12. The method of claim 7, further comprising: using the distributed ledger to recover the query-and-command system.

13. A processor-readable storage medium, having stored thereon processor-executable code that, upon execution by at least one processor, enables actions, comprising:
verifying, by a first node using trusted execution environment (TEE) attestation, that a plurality of other nodes complies with a governance process defined by a consortium blockchain, wherein the consortium blockchain comprises the first node and the plurality of other nodes;

executing, in a TEE of the first node, query-and-command code of the first node, database code of the first node, and distributed ledger code of the first node, such that execution of the distributed ledger code of the first node instantiates a first instance of a distributed ledger of the consortium blockchain, and such that execution of the query-and-command code of the first node instantiates a first instance of a query-and-command system, wherein the consortium blockchain is distributed among the first node and the plurality of other nodes, and wherein the query-and-command system is distributed among the first node and the plurality of other nodes;

updating the first instance of the distributed ledger based on a first transaction and a second transaction that are associated with the query-and-command system by updating a journal of effects in the distributed ledger with an entry generated for the first transaction and an entry generated for the second transaction, wherein the journal of effects comprises a commit point after the entries for the first transaction and the second transaction;

executing the first transaction on the query-and-command system;

executing the second transaction on the query-and-command system; and upon reaching the commit point, updating a database of the query-and-command system based on entries in the journal of effects since a last commit point, wherein the entries in the journal of effects since the last commit point comprise the entries for the first transaction and the second transaction.

14. The processor-readable storage medium of claim 13, wherein the query-and-command system is at least one of a message broker.

15. The processor-readable storage medium of claim 13, the actions further comprising: executing, in the TEE of the first node, proxy code.

16. The processor-readable storage medium of claim 13, wherein the query-and-command system is a relational database.

17. The processor-readable storage medium of claim 13, the actions further comprising: providing a universally verifiable receipt for the first transaction, wherein the universally verifiable receipt includes a Merkle tree proof and a signed root hash.

18. The processor-readable storage medium of claim 13, the actions further comprising: using the distributed ledger to recover the query-and-command system.

* * * * *